(12) United States Patent
Halahmi et al.

(10) Patent No.: US 7,346,666 B2
(45) Date of Patent: Mar. 18, 2008

(54) VIRTUAL MAILBOX

(75) Inventors: Erez Halahmi, Petach Tikva (IL); Eran Fuchs, Kfar Saba (IL); Ariel Yaloz, Tel Aviv (IL); Keren Kroglen, Tel Aviv (IL)

(73) Assignee: Axis Mobile Ltd. (IL)

( * ) Notice: Subject to any disclaimer, the term of this patent is extended or adjusted under 35 U.S.C. 154(b) by 899 days.

(21) Appl. No.: 10/367,995

(22) Filed: Feb. 19, 2003

(65) Prior Publication Data

US 2004/0162913 A1    Aug. 19, 2004

(51) Int. Cl.
*G06F 15/16* (2006.01)
*G06F 15/167* (2006.01)

(52) U.S. Cl. .................... 709/217; 709/213; 709/245

(58) Field of Classification Search ............. 709/206, 709/207, 245, 246, 225, 213, 217
See application file for complete search history.

(56) References Cited

U.S. PATENT DOCUMENTS

| | | | |
|---|---|---|---|
| 2002/0087646 A1* | 7/2002 | Hickey et al. | 709/206 |
| 2002/0122543 A1* | 9/2002 | Rowen | 379/93.01 |
| 2003/0038978 A1 | 2/2003 | Oashi | |
| 2004/0006597 A1 | 1/2004 | Hughes | |
| 2004/0111612 A1 | 6/2004 | Choi et al. | |
| 2004/0203947 A1* | 10/2004 | Moles | 455/466 |
| 2006/0010221 A1* | 1/2006 | Srinivasan | 709/206 |

* cited by examiner

*Primary Examiner*—Paul H. Kang
(74) *Attorney, Agent, or Firm*—Ohlandt, Greeley, Ruggiero & Perle, L.L.P.

(57) ABSTRACT

A system and method for a virtual mailbox, in which a user e-mail identity, such as an e-mail address for example, is decoupled from any specific e-mail account, or optionally from any specific action required to authorize the user of the e-mail address to access messages on the server, for example to send or receive messages.

24 Claims, 3 Drawing Sheets

Figure 2 (con't1)
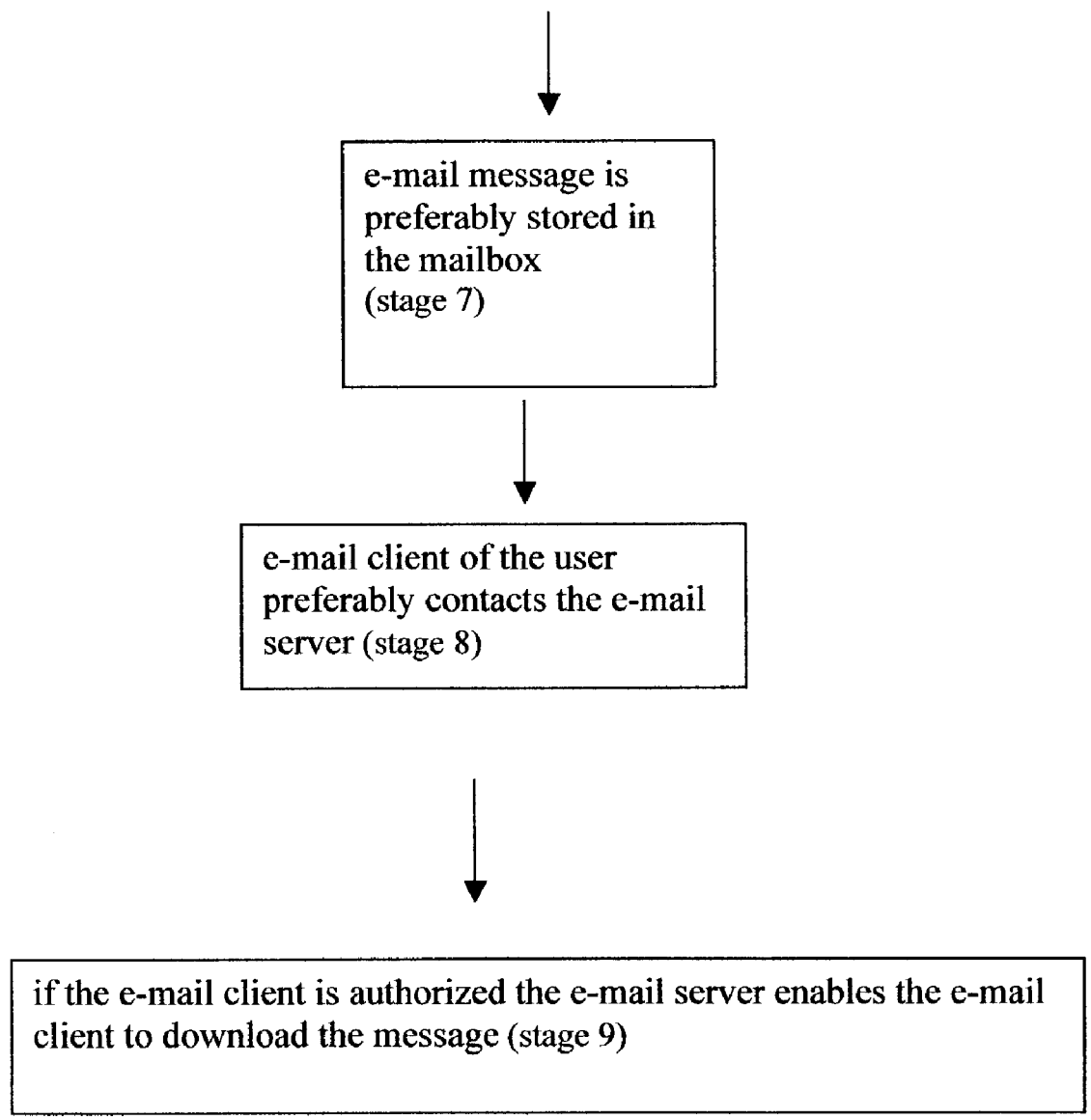

VIRTUAL MAILBOX

FIELD OF THE INVENTION

The present invention is of a system and method for more efficient e-mail receipt and storage, and in particular, for such a system and method which is capable of enabling a new user account to be easily and efficiently established.

BACKGROUND OF THE INVENTION

Currently, most computer users (hereinafter also referred to as "users") receive e-mail messages through a connection between a computer and an e-mail server, in which the-e-mail server provides the user with an e-mail account. The e-mail server holds the received e-mail messages for the user, and may be installed at an ISP (Internet Service Provider), for example. Such servers usually operate according to the POP3 (Post Office Protocol 3) protocol or alternatively according to the IMAP4 (Internet Message Access Protocol, version 4) protocol or any other proprietary protocol such as Microsoft MAPI for example (Microsoft Corp, USA). The computer of the user must operate an e-mail client, which is a software program for communicating with the e-mail server in order to download the e-mail messages, and then for displaying these e-mail messages to the user. The e-mail client communicates with the e-mail server according to the POP3 or IMAP4 protocol for receiving e-mail messages, and SMTP (Simple Message Transfer Protocol) for sending (or forwarding) e-mail messages.

In order for the e-mail client of the user to be permitted to send and receive messages through the e-mail server, the user must be authorized. Typically, the user must have an e-mail account at the e-mail server, and must enter a user name and password through the e-mail client for accessing the account, in order to send or receive messages. Messages which are sent to the e-mail address of the user are stored on the e-mail server, at least until the user downloads these messages through the e-mail client. The storage area on the server for each user is often referred to as a "mailbox". Such a mailbox often has a maximum size, such as 5 MB for example. However, this fixed size is clearly disadvantageous, because the user may only wish to use 1 MB for example.

Furthermore, establishing the e-mail account for the user also involves a complex process which is inefficient. For example, a provisioning process needs to be performed before the e-mail service can be provided and the account established. This process allocates the required resources in the system of the provider, such as allocation of space in the e-mail server, allocation of a user record in the data base and so forth. The duration of this process can take between 30 seconds and 2 minutes, depending on system size, which does not include the time of the administrator who may need to manually determine such limits as the amount of overall storage space permitted, largest message size etc. Moreover, usually the storage space allocated for the user is more than the space required, as previously described.

A more efficient process would enable the e-mail account to be established rapidly and efficiently. Such a process could be particularly useful for establishing temporary e-mail accounts, in which the user needs to have access to the account for a short period of time. This process would also preferably enable the size of the storage area on the e-mail server to be determined more flexibly, at least partially according to the need of the user. Unfortunately, such a process is not currently available.

SUMMARY OF THE INVENTION

The background art does not teach or suggest a system or method for more flexibly providing an e-mail account. The background art also does not teach a system or method for more rapidly and efficiently providing an e-mail account. The background art also does not teach or suggest a system or method for more flexibly allocating storage on an e-mail server for e-mail accounts.

The present invention overcomes the background art by providing a system and method for a virtual mailbox, in which a user e-mail identity, such as an e-mail address for example, is decoupled from any specific e-mail account, or optionally from any specific action required to authorize the user of the e-mail address to access messages on the server, for example to send or receive messages.

The present invention may optionally be implemented with a single mailbox (e-mail message storage area) on an e-mail server, although alternatively a plurality of such mailboxes may be allocated. Each such mailbox is optionally and preferably shared between a plurality of users, or more specifically, a plurality of e-mail addresses of users. Each such mailbox preferably has a generic e-mail identity. For example, the mailbox may optionally be associated with a username called "guest", with the password as "guest1" on an e-mail server called "celltrex.com". Therefore, the mailbox may optionally be associated with an e-mail account associated with the username of "guest".

Optionally and more preferably, the user name for the new user is used to create a unique e-mail address for that user, such as new-user@celltrex.com for example, preferably without associating that e-mail address with a separate mailbox. Instead, the e-mail address is preferably associated with the generic mailbox as previously described.

The user may optionally retrieve the e-mail message as for regular e-mail messages. The e-mail client of the user would preferably "log onto" the e-mail server, or otherwise become identified to the server. For this example, the e-mail server is preferably associated with the name "celltrex.com", as shown above with regard to the exemplary e-mail address. For the present invention, such identification preferably includes at least entering the username through the e-mail client, which is "new-user". More preferably, the identification also includes the password that was sent to the new user by SMS, or alternatively according to any other messaging or notification protocol or mechanism. The e-mail messages would optionally and preferably be retrieved through the e-mail client, for example according to mechanisms which are well known in the art.

The e-mail client may optionally and preferably be implemented through a Web browser, such that the client is embedded in the browser, or alternatively, such that the e-mail messages are retrieved through the Web browser according to the HTTP protocol and/or other Web browser protocol, alternatively or in addition to retrieval of e-mail messages according to an e-mail message protocol.

According to the present invention, there is provided a method for decoupling a user e-mail identity from a specific e-mail account, comprising: providing a generic mailbox for storing e-mail messages for a plurality of users, the generic mailbox being associated with a generic name; receiving an e-mail message addressed according to the user e-mail identity, wherein the user e-mail identity differs from the generic name; adjusting at least one header of the e-mail message according to the generic name; and storing the e-mail message in the generic mailbox.

Preferably, the method further comprises retrieving the e-mail message from the generic mailbox according to the user e-mail identity. More preferably, the user e-mail identity comprises a username, the username forming a portion of an e-mail address for addressing the e-mail message. Also more preferably, the user e-mail identity further comprises a password. Most preferably, the adjusting the e-mail message comprises adding the user e-mail identity to a field of the e-mail message. Also most preferably, the e-mail message is transmitted according to SMTP (simple message transfer protocol), and wherein the adding the user e-mail identity comprises adding the user e-mail identity to an X-field of a header of the e-mail message.

Preferably, the password is required for retrieving the e-mail message. More preferably, the password and the username are added to separate X-fields of the header. Most preferably, the e-mail message is retrieved through an e-mail client, and wherein the e-mail client provides the username.

Preferably, the e-mail client provides the password. Optionally and preferably, the password is automatically generated. More preferably, the password is sent to the user. Most preferably, the password is sent to the user in an SMS (short message service) message.

Preferably, receiving the e-mail message further comprises: determining whether the e-mail message is a first message received for the user e-mail identity; if the e-mail message is the first message, associating the user e-mail identity with the generic mailbox. More preferably, associating the user e-mail identity with the generic mailbox further comprises associating a password with the e-mail message.

According to another embodiment of the present invention, there is provided a method for sharing a mailbox by a plurality of users on an e-mail server, comprising: associating each user with a separate user e-mail identity; associating a plurality of user e-mail identities with the mailbox; if an e-mail message is received by the e-mail server, the e-mail message being addressed according to a user e-mail identity, storing the e-mail message in the mailbox; and permitting the user to retrieve the e-mail message after the user provides the user e-mail identity to the e-mail server.

Preferably, a size of the mailbox is flexibly determined according to a collective size of a plurality of e-mail messages stored in the mailbox. Optionally and preferably, the user e-mail identity is decoupled from a specific e-mail account, such that the specific e-mail account for the user e-mail identity is not provided on the e-mail server. Also optionally and preferably, the generic mailbox is associated with a generic name, the generic name differing from the user e-mail identity, and wherein the storing the e-mail message further comprises adjusting at least one header of the e-mail message according to the generic name.

According to yet another embodiment of the present invention, there is provided a system for decoupling a user e-mail identity from a specific e-mail account, comprising: (a) an e-mail server having a generic mailbox for storing e-mail messages for a plurality of users; (b) an e-mail processor module at the e-mail server for processing an e-mail message being addressed according to the user e-mail identity, wherein the user e-mail identity is associated with the generic mailbox; and (c) an e-mail client for being capable of retrieving only an e-mail message from the generic mailbox being addressed according to the user e-mail identity.

According to still another embodiment of the present invention, there is provided a method for decoupling a user e-mail identity from a specific e-mail account, comprising: providing a generic mailbox for storing e-mail messages for a plurality of users; receiving an e-mail message addressed according to the user e-mail identity; storing the e-mail message in the generic mailbox; and retrieving the e-mail message according to the user e-mail identity from the generic mailbox, such that only an e-mail message being addressed according to the user e-mail identity is retrievable from the generic mailbox by the user.

Hereinafter, the term "network" refers to a connection between any two or more computational devices which permits the transmission of data.

Hereinafter, the term "computational device" includes, but is not limited to, personal computers (PC) having an operating system such as Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers, PDA (personal data assistant) devices, paging devices ("pagers"), any type of wireless communication device such as cellular telephones, any type of WAP (wireless application protocol) enabled device, or any other wireless communication device, wearable computers of any sort; and any device which can be connected to a network as previously defined and which has an operating system. It is understood that the term "computer", as used herein, may refer to substantially any computational device.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

In addition, the present invention could be implemented as software, firmware or hardware, or as a combination thereof. For any of these implementations, the functional stages performed by the method could be described as a plurality of instructions performed by a data processor.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
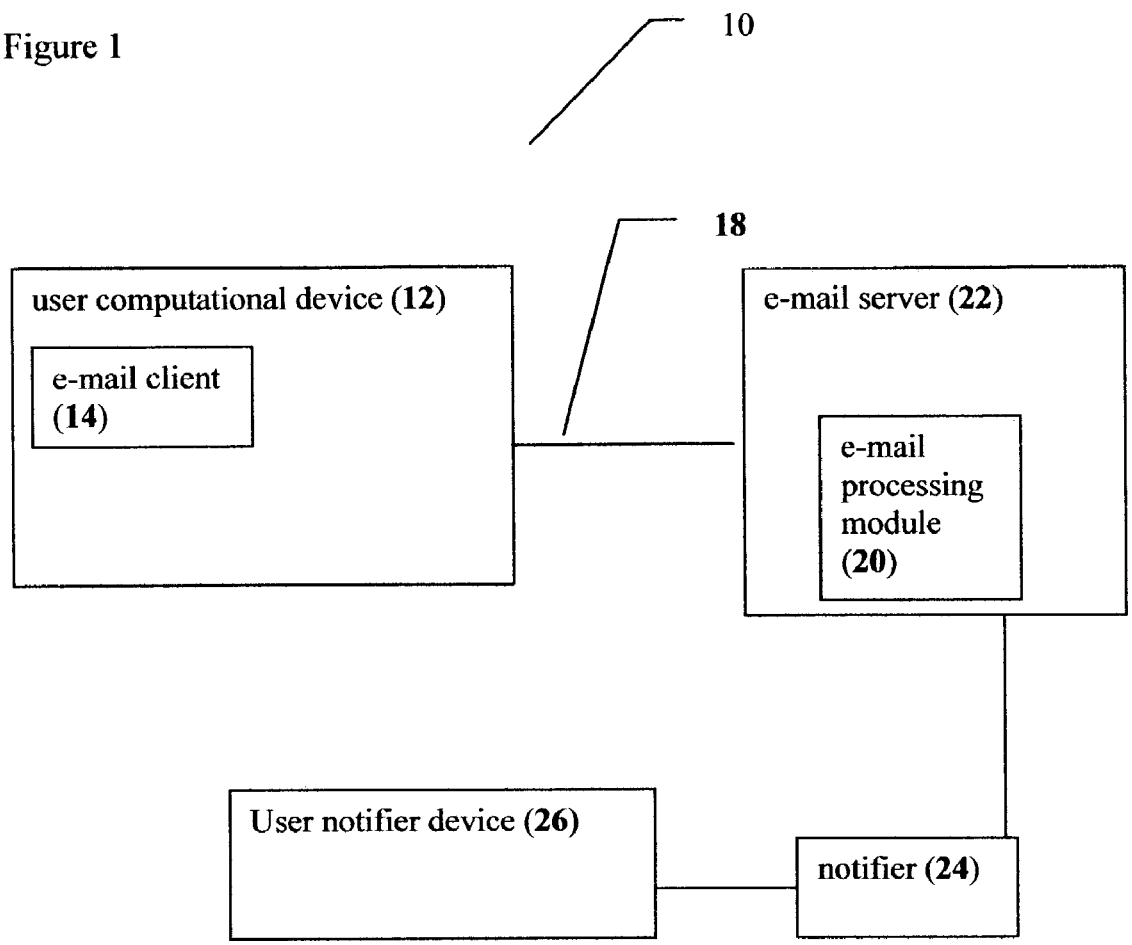
FIG. 1 is a schematic block diagram of an exemplary system according to the present invention.

The present invention is of a system and method for a virtual mailbox, in which a user e-mail identity, such as an e-mail address for example, is decoupled from any specific e-mail account, or optionally from any specific action required to authorize the user of the e-mail address to access messages on the server, for example to send or receive messages.

The present invention may optionally be implemented with a single mailbox (e-mail message storage area) on an e-mail server, although alternatively a plurality of such mailboxes may be allocated. Each such mailbox is optionally and preferably shared between a plurality of users, or more specifically, a plurality of e-mail addresses of users. Each such mailbox preferably has a generic e-mail identity. For example, the mailbox may optionally be associated with a username called "guest", with the password as "guest1" on an e-mail server called "celltrex.com". Therefore, the mailbox may optionally be associated with an e-mail account associated with the username of "guest".

According to an optional but preferred embodiment of the present invention, a method for decoupling a user e-mail identity from a specific e-mail account includes providing a generic mailbox for storing e-mail messages for a plurality of users, which is associated with a generic name. Next, an e-mail message that is addressed according to the user e-mail identity is received, wherein the user e-mail identity differs from the generic name. In other words, if the generic name is "guest", the user e-mail identity is preferably not "guest", but may optionally be "new-user" as described below for example. Next, the method preferably includes adjusting at least one header of the e-mail message according to the generic name. The e-mail message is then preferably stored in the generic mailbox.

When a new user wants to register to the system of the present invention, in order to be able to send and receive e-mail messages, preferably no separate e-mail account is created for the new user. Instead, preferably the new user has a username such as "new-user", such that e-mail messages would be sent to new-user @celltrex.com. Optionally and preferably, the new user would not even need to register to the system at all; instead, once an e-mail message was sent to the address new-user@celltrex.com, the e-mail server (or a proxy that receives the message before the e-mail server) would optionally and preferably automatically add an "X-field" to this message in which the "RECIPIENT" (RCPT) field is added and/or amended to reflect the name of the new user, "new-user", as well as a randomly generated password (in the same X-field or in a different X-field). More preferably, an SMTP (simple mail transfer protocol) module inside the e-mail server, or alternatively an SMTP proxy for receiving the message before the server, would add the X-field, although alternatively, any type of mail processing module could optionally perform this operation, as described in greater detail below.

With regard to the structure of e-mail messages, such as for the above fields, as described with regard to RFC822 and RFC2045 (Network Working Group), the e-mail message has a predefined structure, such that a multi-part message has a main header, followed by the body. The header includes various fields, such as the RCPT TO field, which are determined according to a predefined lexical structure for such e-mail protocols as SMTP for example. Examples of automatically determined header fields include DATE for the date that the message was sent, MESSAGE-ID, which is the unique identifier of a message, IN-REPLY-TO, which is the identifier of the message to which this message is a reply, and RETURN-PATH, which can optionally be used to indicate the path back to the sender.

Briefly, SMTP itself is an illustrative, non-limiting example of a suitable e-mail protocol according to which the present invention may optionally operate. SMTP is described for example with regard to SMTP RFC 2821 (Network Working Group, available from www.ietf.org/rfc/rfc2821.txt as of Feb. 12 2003). For this protocol, extensions to the SMTP services are identified with an "X", hence the reference to the "X-field" for the "RECIPIENT" field. For the present invention, an extension to SMTP which is optionally and preferably implemented is to enable the new user, "new-user", to be associated with a portion of the generic mailbox for "guest". The extension therefore preferably includes the name of the new user, "new-user" to be added to the "RECIPIENT" (RCPT) field, with the letter "X" before the name of the new user. Alternatively or additionally, any other X-field, such as X-MY-RCPT-ADDRESS for example, could optionally be used. The letter "X" indicates that the service extension is local, according to the procotol.

In addition, a password may also optionally be added as described above; such a password may also optionally be added to the RCPT field, also preferably with the letter "X" before the password. Alternatively or additionally, the password could optionally be added to any other user defined X-field, such as X-MY-PASSWORD for example. The information after the "X" therefore preferably serves for one or more parameters for the extension service. For this example with the service extension option according to the protocol, the e-mail server preferably issues the "EHLO" command to begin the SMTP session for receiving the e-mail message from the transmitting server (computational device), rather than the "HELO" command, to indicate the ability to support service extensions. However, it should be noted that the use of the "EHLO" command is not essential.

Also alternatively and preferably, the e-mail server would be provided information about the new user who would be using the e-mail address, new-user@celltrex.com, before such a message sent for the first time. Such information could optionally be manually provided, or alternatively could be automatically provided. The password could optionally also be randomly generated for this situation as well.

The "RCPT TO" SMTP field preferably changes to guest@celltrex.com and the message is stored in the guest account of the celltrex.com e-mail server. Changing this SMPT field enables the message to be associated with the correct mailbox, which in this example is the generic mailbox associated with "guest".

An SMS (short message service) message is optionally and preferably sent to the new user, for example through the cellular telephone or other wireless communication device of the new user, with the random password that was generated. Of course, the password may optionally and alternatively be sent according to any other messaging or notification protocol or mechanism.

The e-mail server may optionally send the message or notification with the random password to the new user, but alternatively and preferably, the password is transmitted to a notifier, which then sends the password to the device of the new user, such as the cellular telephone or other wireless communication device for example.

Alternatively, this user may optionally have a password from another application of the same provider or manager of the e-mail server, in which case preferably that password is used. Also alternatively, the password may optionally be determined manually, or alternatively may be determined automatically from another source. For example, if the new user had a password to be used, optionally and preferably, the new user could notify the e-mail server, optionally by sending an SMS message to the e-mail server, or alternatively by sending a message sent according to another, preferably non-email based, messaging protocol.

The user may then optionally retrieve the e-mail message as for regular e-mail messages. The e-mail client of the user would preferably "log onto" the e-mail server, or otherwise become identified to the server. For the present invention, such identification preferably includes at least entering the username through the e-mail client, which is "new-user". More preferably, the identification also includes the password that was sent to the new user by SMS, or alternatively according to any other messaging or notification protocol or mechanism. The e-mail messages would optionally and preferably be retrieved through the e-mail client, for example according to mechanisms which are well known in the art.

The e-mail client may optionally and preferably be implemented through a Web browser, such that the client is embedded in the browser, or alternatively, such that the e-mail messages are retrieved through the Web browser according to the HTTP protocol and/or other Web browser protocol, alternatively or in addition to retrieval of e-mail messages according to an e-mail message protocol.

The principles and operation of the present invention may be better understood with reference to the drawings and the accompanying description. The present invention is operative with any e-mail protocol, including but not limited to, IMAP4 and POP3 protocols for receiving e-mail messages. The POP3 protocol is explained in RFC1725, while the IMAP4 protocol is explained in RFC2060, both from the Network Working Group, although of course the scope of the present invention is not limited to operation with these protocols.

Referring now to the drawings, FIG. 1 is a schematic block diagram of a system according to the present invention. A system 10 features a user computational device 12 which operates an e-mail client 14. E-mail client 14 can optionally be implemented as any type of software program which is able to communicate according to standard e-mail messaging protocols, such as POP3 and IMAP4 for example. A non-limiting example of such a software program is the Outlook™ program (Microsoft Corp., USA). Alternatively, e-mail client 14 may optionally be implemented through a Web browser and/or any other type of application or functionality for communicating according to HTTP and/or any other suitable communication protocol. For the purposes of explanation only and without any intention of being limiting, e-mail client 14 is assumed, for this example, to be capable of communicating according to standard e-mail messaging protocols.

The user is able to interact with e-mail client 14. User computational device 12 is connected to a network 18, such as the Internet for example, through which user computational device 12 is in communication with an e-mail server 22. E-mail server 22 preferably features an e-mail processing module 24, for implementing the present invention.

E-mail server 22 preferably also features at least one storage area for storing e-mail messages, termed a "mailbox". According to the background art, each such mailbox or storage area may have been associated with a single username or e-mail account. For the present invention, preferably such a mailbox is associated with a generic username for a plurality of separate e-mail addresses, and more preferably for a plurality of separate users. In other words, the mailbox is associated with a plurality of users, who would previously have each received a separate such mailbox according to the background art. The mailbox preferably includes an amount of storage on e-mail server 22, which may optionally be predetermined, or which alternatively may be allowed to increase and decrease as necessary.

The mailbox is optionally and preferably associated with a username, such as "guest" for example, and a password, such as "guest1" for example, such that a generic e-mail account is more preferably created for the mailbox.

When e-mail server 22 is notified of a new user, e-mail server 22 preferably receives information in the form of a new user e-mail address. For example, if the name associated with e-mail server 22 is "celltrex.com", then preferably e-mail server 22 would receive the notification in the form of information concerning new-user@celltrex.com. E-mail server 22 would then preferably assign this new e-mail address to the mailbox (or alternatively to one of a plurality of mailboxes, if present). Optionally and more preferably, e-mail server 22 would associate the e-mail address with a password.

E-mail server 22 may optionally and preferably generate such a password, more preferably randomly. Alternatively, this user may optionally have a password from another application of the same provider or manager of e-mail server 22, in which case optionally and preferably that password is used. Also alternatively, the password may optionally be determined manually, or alternatively may be determined automatically from another source. For example, if the new user had a password to be used, optionally and preferably, the new user could notify e-mail server 22, optionally by sending an SMS (short message service) message, directly or indirectly, to e-mail server 22. The new user could also notify e-mail server 22, directly or indirectly, alternatively by sending a message sent according to another, preferably non-email based, messaging protocol.

If e-mail server 22 generates the password, and/or otherwise is to notify the new user of the password, an SMS (short message service) message is optionally and preferably sent to the new user, for example through the cellular telephone or other wireless communication device of the new user, shown as a user notifier device 26, with the random password that was generated. Preferably, e-mail server 22 transmits the password to a notifier 24, which then preferably sends the password to user notifier device 26. Alternatively, e-mail server 22 sends the password to user notifier device 26. Also optionally and alternatively, the password may be sent to user computational device 12 through a suitable messaging and/or notification protocol, such that user computational device 12 comprises user notifier device 26. Such an implementation may be preferred, for example, if user computational device 12 is implemented as a cellular telephone or other wireless communication device. Of course, the password may optionally and alternatively be sent according to any other messaging or notification protocol or mechanism.

E-mail server 22 may optionally be notified of the existence of the new user by receiving an e-mail message addressed to the new user, for example as new-user@celltrex.com to continue the above example.

In any case, once e-mail server 22 has been informed of the existence of the new user, and the password has been optionally and preferably associated with the e-mail address of the new user, then preferably e-mail processing module 20 adds an X-field to the message, more preferably at the RCPT TO field (recipient field). As described above, the letter "X" is optionally and preferably added before one or more parameter value(s), each of which is associated with a parameter, in order to indicate that the information is related to a local service extension that is supported by e-mail server 22. For this non-limiting example, the information in the X-field preferably indicates the username associated with the new user, or "new-user". The information may also optionally indicate the password.

This identifying information enables the e-mail message to be stored in the generic mailbox associated with the name "guest". The actual recipient described in the RCPT TO field is preferably guest@celltrex.com.

When the user wishes to retrieve one or more e-mail messages, the user activates e-mail client 14. E-mail client 14 optionally and preferably communicates directly with e-mail server 22, although alternatively, such communication may optionally be performed through a proxy (not shown). E-mail client 14 at user computational device 12 optionally and preferably provides some identifier to e-mail server 22, for example by providing the username of the user. As noted above, optionally and more preferably, such a username is in the form of the username portion of the e-mail address (the portion before the symbol "@"). With regard to this non-limiting example, such a username may be "new-user".

Optionally and more preferably, e-mail client 14 also provides the password to e-mail server 22. As described previously, preferably the username, and also the password (if present), is provided as a service extension to SMTP, according to the service extension protocol. E-mail server 22 (and/or an e-mail proxy (not shown)) receives a request from e-mail client 14 to login to user "new_guest", optionally with a password such as "12345" for example. The password "12345" would have been previously generated through e-mail server 22 and sent to the user, optionally and preferably through user notifier device 26. E-mail server 22 "logs" into the "guest" mailbox and looks for a message that contains "new_guest" in the "X-MY-RCPT" field and "12345" in the "X-MY-PASSWORD" field. Of course, other fields may optionally be used in place of, or in addition to, these exemplary fields.

E-mail server 22 then preferably fetches those messages from the generic mailbox that are associated with the username, and checks the password that is optionally and more preferably associated with each message, for example through the "X-field".

Alternatively, when e-mail client 14 requests retrieval of one or more messages from e-mail server 22, more preferably e-mail client 14 communicates with e-mail processing module 20, which then receives the identifier, and optionally also the password (if present). E-mail processing module 20 then preferably fetches those messages from the generic mailbox that are associated with the username, and checks the password that is optionally and more preferably associated with each message, for example through the "X-field".

Figure 2:
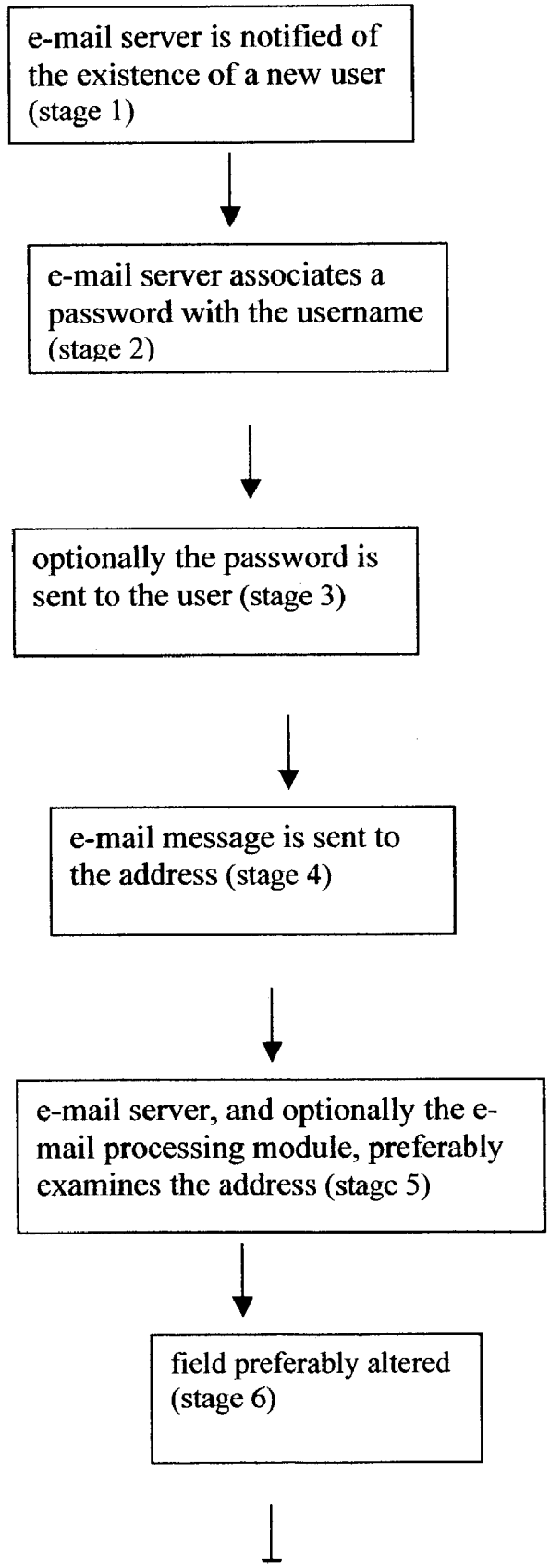
FIG. 2 is a flowchart of an exemplary method according to the present invention.

FIG. 2 is a flowchart of an exemplary method according to the present invention for sending and/or retrieving an e-mail message.

In stage 1, the e-mail server determines the existence of a new user. As for the example above, the new user may be given the e-mail address new-user@celltrex.com, again assuming that the name associated with the e-mail server is "celltrex.com".

In stage 2, the e-mail server associates a password with the username "new-user". As described above, such a password may optionally be generated randomly, or alternatively may be provided from some other source, for example from the user.

In stage 3, optionally the password is sent to the user, for example by SMS to a wireless communication device such as a cellular telephone, although alternatively any other form of notification and/or messaging may optionally be used.

In stage 4, an e-mail message is sent to the address new-user@celltrex.com. It should be noted that this stage may optionally and preferably be performed as part of stage 1, such that the first time that the e-mail server receives an e-mail message addressed to new-user@celltrex.com, stages 1-3 are performed, more preferably automatically.

In stage 5, the e-mail server, and optionally the e-mail processing module, preferably examines the address, and determines that "new-user" is associated with the generic mailbox that is associated with the name "guest". The e-mail server (or the e-mail processing module) then preferably converts the RCPT TO field to show the name guest@celltrex.com in stage 6. Optionally and more preferably, the e-mail server (or the e-mail processing module) then preferably adds an "X-field", with the username "new-user", to the RCPT TO field. Most preferably, the e-mail server (or the e-mail processing module) also adds the password to this field. In stage 7, the e-mail message is preferably stored in the mailbox.

In stage 8, the e-mail client of the user (optionally implemented with, through and/or according to a Web browser for example) preferably contacts the e-mail server. Preferably, the username, and optionally also the password, are entered through the, e-mail client.

In stage 9, if the e-mail client is authorized (according to the username and optionally also the password), then the e-mail server enables the e-mail client to download the message(s) from the generic mailbox.

While the invention has been described with respect to a limited number of embodiments, it will be appreciated that many variations, modifications and other applications of the invention may be made.

What is claimed is:

1. A method for enhancing the efficiency of e-mail receipt and storage on an e-mail server by decoupling a user e-mail identity from a specific e-mail account, the method comprising:
   providing a generic mailbox on an e-mail server for storing e-mail messages addressed to different users, said generic mailbox being associated with a generic name;
   receiving an e-mail message addressed according to a user e-mail identity, wherein the user e-mail identity comprises a username and wherein said username differs from said generic name;
   adjusting at least one header of said e-mail message according to said generic name;
   adding the user e-mail identity to a field of said e-mail message; and
   storing said e-mail message in said generic mailbox.

2. The method of claim 1, further comprising: retrieving said e-mail message from said generic mailbox according to the user e-mail identity.

3. The method of claim 1, wherein said username forms a portion of an e-mail address for addressing said e-mail message.

4. The method of claim 1 wherein said adding the user e-mail identity to a field of said e-mail message comprises adding the username and a password to separate fields of the e-mail message, said username and password are required for retrieving said e-mail message.

5. The method of claim 4, wherein said e-mail message is transmitted according to SMTP (simple message transfer protocol), and wherein said password and said username are added to separate X-fields of a header of said e-mail message.

6. The method of claim 4, wherein said e-mail message is retrieved through an e-mail client, and wherein said e-mail client provides said username.

7. The method of claim 6, wherein said e-mail client further provides said password.

8. The method of claim 4, wherein said password is automatically generated.

9. The method of claim 8, wherein said password is sent to the user.

10. The method of claim 9, wherein said password is sent to the user in an SMS (short message service) message.

11. The method of claim 1, wherein said e-mail message is transmitted according to SMTP (simple message transfer protocol), and wherein said adding the user e-mail identity comprises adding the user e-mail identity to an X-field of a header of said e-mail message.

12. The method of claim 1, wherein said receiving said e-mail message further comprises:
   determining whether said e-mail message is a first message received for the user e-mail identity;
   if said e-mail message is said first message, associating the user e-mail identity with said generic mailbox.

13. The method of claim 12, wherein said associating the user e-mail identity with said generic mailbox further comprises associating a password with said e-mail message.

14. A method for sharing a mailbox by a plurality of users on an e-mail server, comprising:
   associating each user with a separate user e-mail identity;
   associating a plurality of user e-mail identities with the mailbox;
   if an e-mail message is received by the e-mail server, said e-mail message being addressed according to a user e-mail identity, storing said e-mail message in the mailbox;
   adding the user e-mail identity to a field of said e-mail message; and
   permitting the user to retrieve said e-mail message after the user provides said user e-mail identity to the e-mail server.

15. The method of claim 14, wherein a size of the mailbox is flexibly determined according to a collective size of a plurality of e-mail messages stored in the mailbox.

16. The method of claim 14, wherein said user e-mail identity is decoupled from a specific e-mail account, such that said specific e-mail account for said user e-mail identity is not provided on said e-mail server.

17. The method of claim 14, wherein said generic mailbox is associated with a generic name, said generic name differing from said user e-mail identity, and wherein said storing said e-mail message further comprises adjusting at least one header of said e-mail message according to said generic name.

18. The method of claim 14, wherein said user email identity comprises a username and wherein said adding the user e-mail identity to a field of said e-mail message comprises adding the username and a password to separate fields of the e-mail message, said username and password are required for retrieving said e-mail message.

19. The method of claim 18, wherein said e-mail message is transmitted according to SMTP (simple message transfer protocol), and wherein the username and password are added to separate X-fields of a header of said e-mail message.

20. A system for enhancing the efficiency of e-mail receipt and storage on an e-mail server by decoupling a user e-mail identity from a specific e-mail account, comprising:
   (a) an e-mail server having a generic mailbox for storing e-mail messages addressed to different users;
   (b) an e-mail processor module at said e-mail server for processing an e-mail message being addressed according to a user e-mail identity, wherein the user e-mail identity is associated with said generic mailbox, said processing comprising adding the user e-mail identity to a field of said e-mail message; and
   (c) an e-mail client for being capable of retrieving only an e-mail message from said generic mailbox being addressed according to the user e-mail identity.

21. The system of claim 20, wherein said user email identity comprises a username and wherein adding the user e-mail identity to a field of said e-mail message comprises adding the username and a password to separate fields of the e-mail message, said username and password are required for retrieving said e-mail message.

22. The method of claim 21, wherein said e-mail message is transmitted according to SMTP (simple message transfer protocol), and wherein the username and password are added to separate X-fields of a header of said e-mail message.

23. A method for decoupling a user e-mail identity from a specific e-mail account, comprising:
   providing a generic mailbox for storing e-mail messages addressed to different users;
   receiving an e-mail message addressed according to the user e-mail identity;
   storing said e-mail message in said generic mailbox;
   adding the user e-mail identity to a field of said e-mail message; and
   retrieving said e-mail message according to the user e-mail identity from said generic mailbox, such that only an e-mail message being addressed according to the user e-mail identity is retreivable from said generic mailbox by the user.

24. A method for decoupling a user e-mail identity from a specific e-mail account, comprising:
   providing a generic mailbox for storing e-mail messages for a plurality of users, said generic mailbox being associated with a generic name;
   receiving an e-mail message addressed according to the user e-mail identity, said e-mail message is transmitted according to SMTP (simple message transfer protocol), wherein the user e-mail identity differs from said generic name and wherein the user e-mail identity comprises a username;
   adjusting at least one header of said e-mail message according to said generic name;
   adding the username and a password to separate X-fields of the header of said e-mail message;
   storing said e-mail message in said generic mailbox; and
   retrieving said e-mail message from said generic mailbox according to said username and password.

* * * * *